United States Patent [19]

Meadors

[11] 4,228,121
[45] Oct. 14, 1980

[54] METHOD AND APPARATUS FOR FORMING MULTIPLE THICKNESS BEAD

[75] Inventor: William R. Meadors, Long Grove, Ill.

[73] Assignee: Peerless Machine & Tool Corporation, Marion, Ind.

[21] Appl. No.: 957,693

[22] Filed: Nov. 6, 1978

[51] Int. Cl.² .................. B29C 1/00; B29C 3/00; B29C 17/03

[52] U.S. Cl. .................. 264/291; 53/561; 264/296; 264/320; 425/383; 425/389; 425/398

[58] Field of Search .............. 264/320, 322, 511, 512, 264/515, 526, 531, 292, 544, 548, 549, 553, 554, 563, 571, 550, 293–296, 291; 425/383, 384, 388, 394, 405 R, 406, 407, 423, 416, 292, 340, 397, 398; 113/121 C, 121 R, 121 V, 120 M; 53/561; 93/36.8, 51 R, 39 C, 36.3

[56] References Cited

U.S. PATENT DOCUMENTS

| | | | |
|---|---|---|---|
| 2,492,886 | 12/1949 | Punte | 113/121 R |
| 2,854,694 | 10/1958 | Mumford | 264/550 |
| 2,962,757 | 12/1960 | Slemmons et al. | 425/388 |
| 3,011,212 | 12/1961 | Marshall et al. | 264/544 |
| 3,041,669 | 7/1962 | Marshall et al. | 425/292 |
| 3,173,174 | 3/1965 | Edwards | 425/292 |
| 3,218,379 | 11/1965 | Edwards | 264/322 |
| 3,284,553 | 11/1966 | Edwards | 264/296 |
| 3,337,664 | 8/1967 | Lyon | 264/550 |
| 3,338,997 | 8/1967 | Tigner | 264/296 |
| 3,357,053 | 12/1967 | Lyon et al. | 425/292 |
| 3,375,551 | 4/1968 | Sherlock | 264/550 |
| 3,414,941 | 12/1968 | Ignell | 425/398 |
| 3,452,396 | 7/1969 | Garver et al. | 425/398 |
| 3,484,518 | 12/1969 | Ignell | 264/322 |
| 3,551,954 | 1/1971 | Knowles | 425/398 |
| 3,580,041 | 5/1971 | Tilly | 425/398 |
| 3,584,109 | 6/1971 | Meadors et al. | 264/292 |
| 3,695,806 | 10/1972 | Arfert | 425/398 |
| 3,751,552 | 8/1973 | Meadors | 264/320 |
| 3,784,342 | 1/1974 | Merklinghaus | 425/392 |
| 3,816,585 | 6/1974 | Edwards | 264/322 |
| 3,824,941 | 7/1974 | Hannon | 113/1 D |
| 3,868,919 | 3/1975 | Schrecker et al. | 113/15 A |
| 3,912,438 | 10/1975 | Padovani | 425/292 |
| 3,917,788 | 11/1975 | Padovani | 425/292 |
| 3,947,205 | 3/1976 | Edwards | 264/550 |
| 3,983,827 | 10/1976 | Meadors | 113/121 C |
| 4,071,598 | 1/1978 | Meadors | 264/292 |
| 4,117,062 | 9/1978 | Uhlig | 264/296 |

Primary Examiner—W. E. Hoag
Attorney, Agent, or Firm—Jenkins, Coffey, Hyland, Badger & Conard

[57] ABSTRACT

A method and apparatus for forming a double-thickness bead in a flexible sheet stock article, such as a container or lid constructed from paper stock. The method includes holding a central region of the paper stock blank near its perimetral edge between cooperating dies, forming an axially extending flange in the blank between the held region and the edge, capturing the edge against radial movement in a groove provided in a ring movable relative to the dies, and moving the ring relative to the dies to form the double-thickness region in the blank between the held portion and edge. The apparatus includes the cooperating relatively movable dies, the movable ring and cooperating draw pads adjacent the ring. The draw pads are movable relative to the dies and ring and cooperate with the dies and ring to form a void into which the double-thickness region is formed. The configuration of the void controls the formation and configuration of the bead.

26 Claims, 10 Drawing Figures

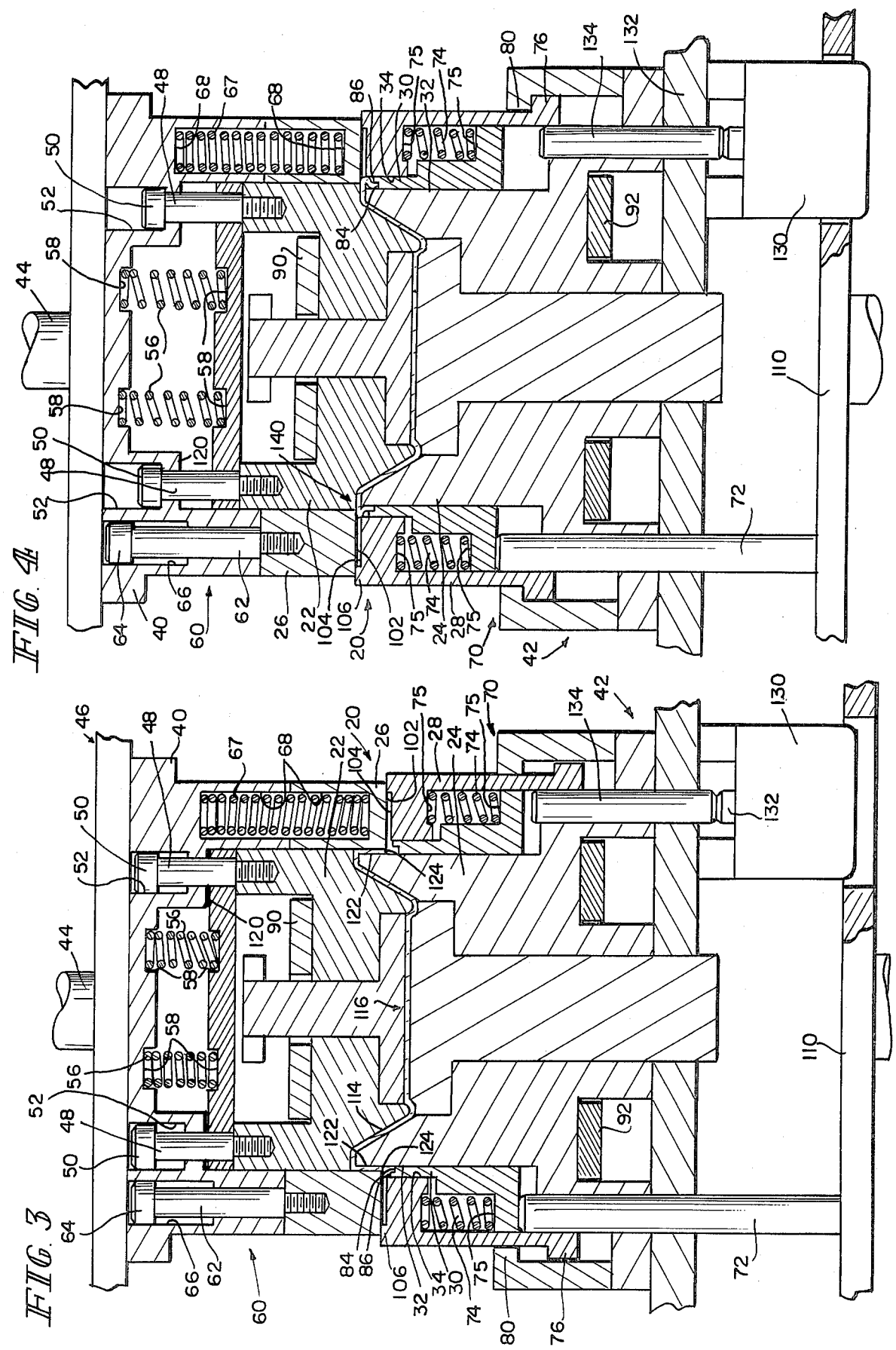

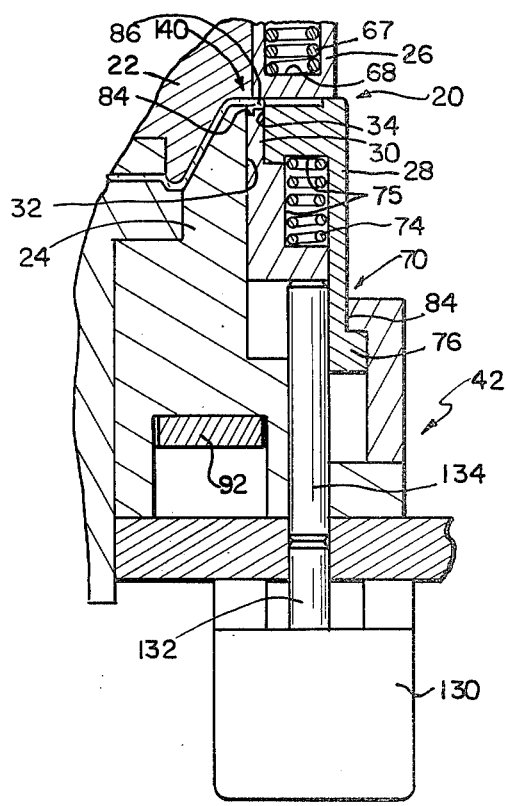

METHOD AND APPARATUS FOR FORMING MULTIPLE THICKNESS BEAD

This invention relates to methods of, and apparatus for, forming a multiple-thickness bead in a sheet or blank of a flexible material, such as thermoplastic material or paper stock, as the sheet or blank is being formed into an article such as a container or lid for a container. The method and apparatus will be described in the context of forming paper stock between dies. It is to be understood, however, that the invention is not so limited.

Reference is here made to the following U.S. Patents and patent applications in the name of the inventor: U.S. Ser. No. 619,377, filed Oct. 3, 1975 and now abandoned; U.S. Ser. No. 759,634 (division of U.S. Ser. No. 619,377) filed Jan. 17, 1977 and now abandoned; U.S. Ser. No. 771,407 (continuation of U.S. Ser. No. 619,377) filed Feb. 23, 1977, and now U.S. Pat. No. 4,071,598 issued Jan. 31, 1978; and U.S. Ser. No. 852,249 (continuation of U.S. Ser. No. 759,634) filed Nov. 17, 1977 and now U.S. Pat. No. 4,160,496, issued July 10, 1977. Reference is here also made to U.S. Pat. No. 3,983,827, issued Oct. 5, 1976 to the inventor herein.

The following U.S. Patents are further considered to be particularly illustrative of this field: Punte U.S. Pat. No. 2,492,886; Amberg U.S. Pat. No. 2,568,698; Amberg U.S. Pat. No. 2,595,046; and, Padovani U.S. Pat. No. 3,912,438; and Schrecker et al U.S. Pat. No. 3,868,919.

Other illustrative art includes the following U.S. Patents: Goodwin U.S. Pat. No. 3,054,144; Black U.S. Pat. No. 3,081,491; Edwards U.S. Pat. No. 3,173,174; Ollier et al U.S. Pat. No. 3,214,797; Koll U.S. Pat. No. 3,352,268; Lyon et al U.S. Pat. No. 3,357,053; Lowe U.S. Pat. No. 3,370,118; Sherlock U.S. Pat. No. 3,375,551; Edwards U.S. Pat. No. 3,418,690; Burkett U.S. Pat. No. 3,444,282; Edwards U.S. Pat. No. 3,464,587; Johnson et al U.S. Pat. No. 3,532,785; Meadors et al U.S. Pat. No. 3,584,109; Matras et al U.S. Pat. No. 3,634,579; Arfert U.S. Pat. No. 3,695,806; Meadors U.S. Pat. No. 3,751,552; Gutlhuber et al U.S. Pat. No. 3,755,528; and, Hannon U.S. Pat. No. 3,824,941.

According to the invention, a method for forming a multiple-thickness bead in a paper stock blank or the like, includes the steps of holding a central portion of the blank between two cooperating dies, forming an axially extending flange in the region of the blank between the central region and the perimetral edge of the blank, capturing the perimetral edge against radial movement in a groove provided in a ring movable relative to the dies, moving the ring relative to the dies to form the region between the central region and edge into the multiple-thickness region, and providing cooperating draw pads adjacent the ring and directly radially outwardly therefrom. The draw pads cooperate with the ring and dies to form a void into which the bead is formed. The configuration controls the formation and configuration of the bead.

Further according to the invention, the void is provided, in part, by a wall of a perimetral groove formed in one of the draw pads adjacent the ring, a wall of the other draw pad, and a wall of the ring adjacent the first-mentioned groove. Illustratively, the void may further be formed in part by a wall of one of the dies, and the second groove may be provided in the draw pad opposite the ring, in the draw pad adjacent the ring, or in the ring itself, adjacent the first-mentioned groove.

Additionally, according to the invention, the cooperating dies include a vertically upper die and a generally opposed, vertically lower die. The draw pads include a vertically upper draw pad and a generally opposed, vertically lower draw pad. The ring is disposed between, and is vertically reciprocable with respect to, adjacent surfaces of the vertically upper die and vertically upper draw pad. Alternatively, the ring may be disposed between, and vertically reciprocable with respect to, adjacent surfaces of the vertically lower die and vertically lower draw pad.

The apparatus of the present invention includes opposed first and second cooperating dies for holding a central region of the blank, a ring, and opposed first and second draw pads movable axially with respect to the first and second dies. The draw pads cooperatively capture the perimetral edge of the blank surrounding the central region to form the edge into an axially extending flange having a proximal end attached to the central region and a distal end axially spaced from the proximal end. The ring includes means defining a groove for capturing the distal end against radial movement. Means are provided for moving the ring and first and second draw pads cooperatively with the distal end of the flange engaged in the first groove to form a multiple thickness bead between the flange proximal and distal end. A void is provided by cooperating surfaces of the ring and first and second draw pads to define the shape, and control the formation, of the multiple-thickness bead.

The invention may best be understood by referring to the following description and accompanying drawings which illustrate the invention. In the drawings:

FIG. 3 is a vertically sectioned side elevational view of the apparatus of FIGS. 1-2 after performing a step of the method subsequent to that illustrated in FIG. 2;

FIG. 4 is a vertically sectioned side elevational view of the apparatus of FIGS. 1-3 after performing a step of the method subsequent to that illustrated in FIG. 3;

FIG. 5 is a fragmentary vertically sectioned side elevational view of the apparatus of FIGS. 1-4 after performing a step of the method subsequent to the step illustrated in FIG. 4;

FIG. 6 is an enlarged and fragmentary vertically sectioned side elevational view of the apparatus illustrated in FIG. 5; and, FIGS. 7-10 are enlarged, fragmentary vertically sectioned side elevational views of some alternative structures to the structure illustrated in FIG. 6.

Figure 2:
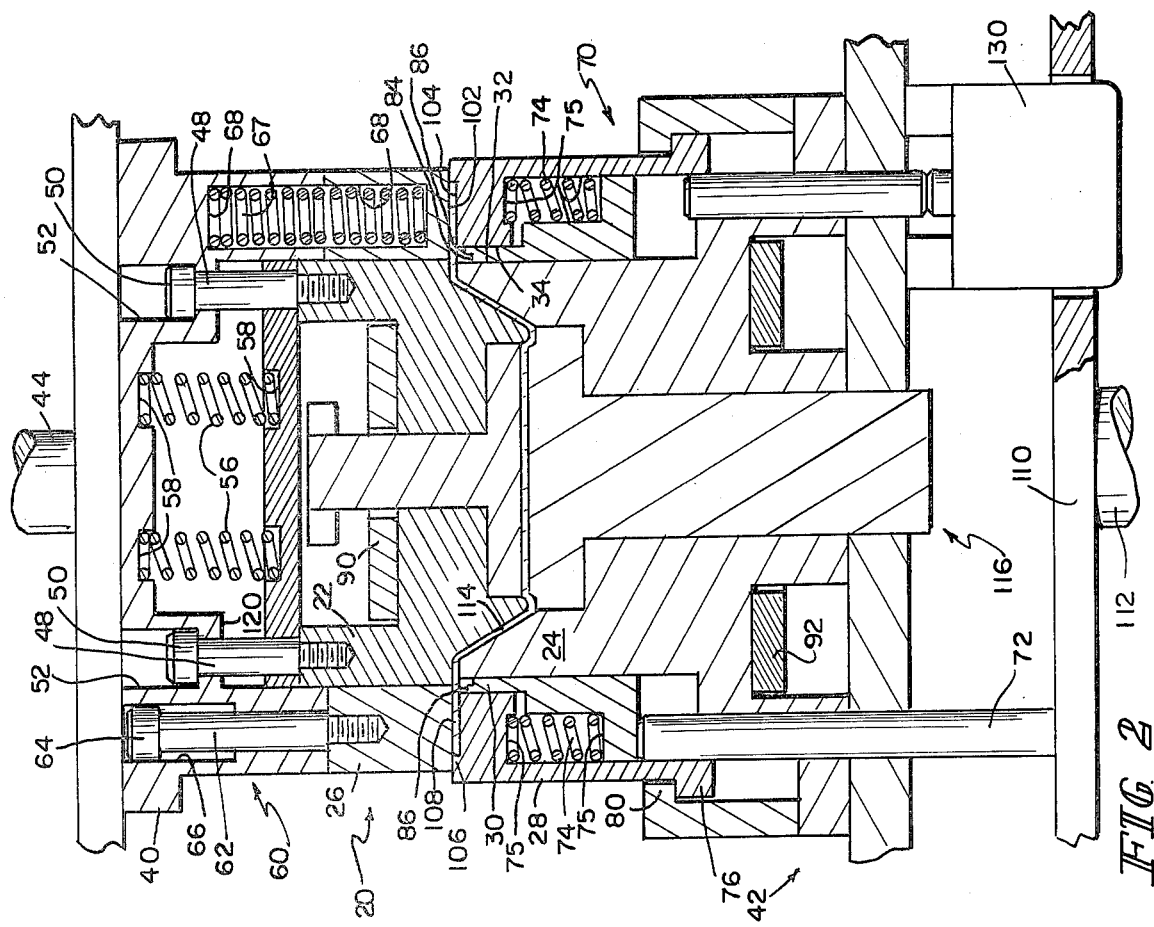
FIG. 2 is a vertically sectioned side elevational view of the apparatus of FIG. 1 about to begin a subsequent step of the method.

Referring now particularly to FIGS. 1-5, the die mechanism 20 of the instant invention illustratively includes a first, vertically upper die member 22, hereinafter sometimes referred to as a "punch," and a second, vertically lower die member 24, hereinafter sometimes referred to as a "horn". Mechanism 20 also includes a first, vertically upper draw pad 26 which extends perimetrally about punch 22 and a second, vertically lower draw pad 28 which extends perimetrally about horn 24. A perimetrally extending ring 30 is vertically reciprocable between adjacent surfaces 32, 34 of horn 24 and draw pad 28, respectively.

Die member 22 and draw pad 26 and their associated components are positioned in an upper die base 40. Die member 24 and draw pad 28 and their associated components are positioned in a lower die base 42. Upper die base 40 is reciprocally mounted with respect to lower die base 42 by means illustratively including a mechanical press working through an associated connecting rod 44.

Means 46 are provided for reciprocably mounting die member 22 from base 40. Means 46 includes cap screws 48 having heads 50 reciprocable in bores 52. Die 22 is urged towards the lowermost extent to its vertical travel relative to base 40 by die springs 56 positioned in wells 58 provided in the die 22 and the base 40.

Means 60 are provided for reciprocably mounting draw pad 26 from base 40. Means 60 includes a plurality of cap screws 62 having heads 64 reciprocable in bores 66 provided in base 40. Draw pad 26 is urged toward the lowermost extent of its vertical travel with respect to base 40 by die springs 67 positioned in wells 68 provided in draw pad 26 and base 40.

Means 70 are provided for reciprocably mounting lower draw pad 28 from die base 42. Means 70 includes a set of ring 30 travel limit pins 72 which limit the vertically downward travel of ring 30 about horn 24. Means 70 further includes a plurality of die springs 74 positioned in wells 75 provided in facing surfaces of draw pad 28 and ring 30. Cooperating retainer rings 76, 80 on draw pad 28 and die base 42, respectively, limit vertically upward travel of draw pad 28 relative to the die base 42.

Ring 30 is provided with a first, perimetrally extending groove 84 in its upper surface 86.

Heating coils 90, 92, respectively are provided in the upper and lower dies 22, 24 as desired, depending, for example, upon the type of material to be formed in the die mechanism 20.

According to the method, a blank 100 of flexible material is provided. Blank 100 typically is in the form of a disc-like round, rectangular, elliptical, etc., flat sheet. The material may be of any known type, including, but not limited to, paper (e.g., milk carton stock), thermoplastic material (e.g., acrylonitrile butadiene styrene), or other suitable material. The blank 100 may be pre-cut (as illustrated), or may be cut from a web of such material (not shown) by a shear ring (not shown) associated with one of draw pads 26, 28 in accordance with known technology. The adjacent surfaces 102, 104 of draw pads 26, 28, respectively provide a shoulder 106 which controls the pressure exerted by the draw pads on the perimetral portion 108 of blank 100 during formation of an article in the die mechanism 20. The provision of the shoulder 106 is described in considerable detail in the aforementioned U.S. Pat. No. 3,584,109.

Figure 1:
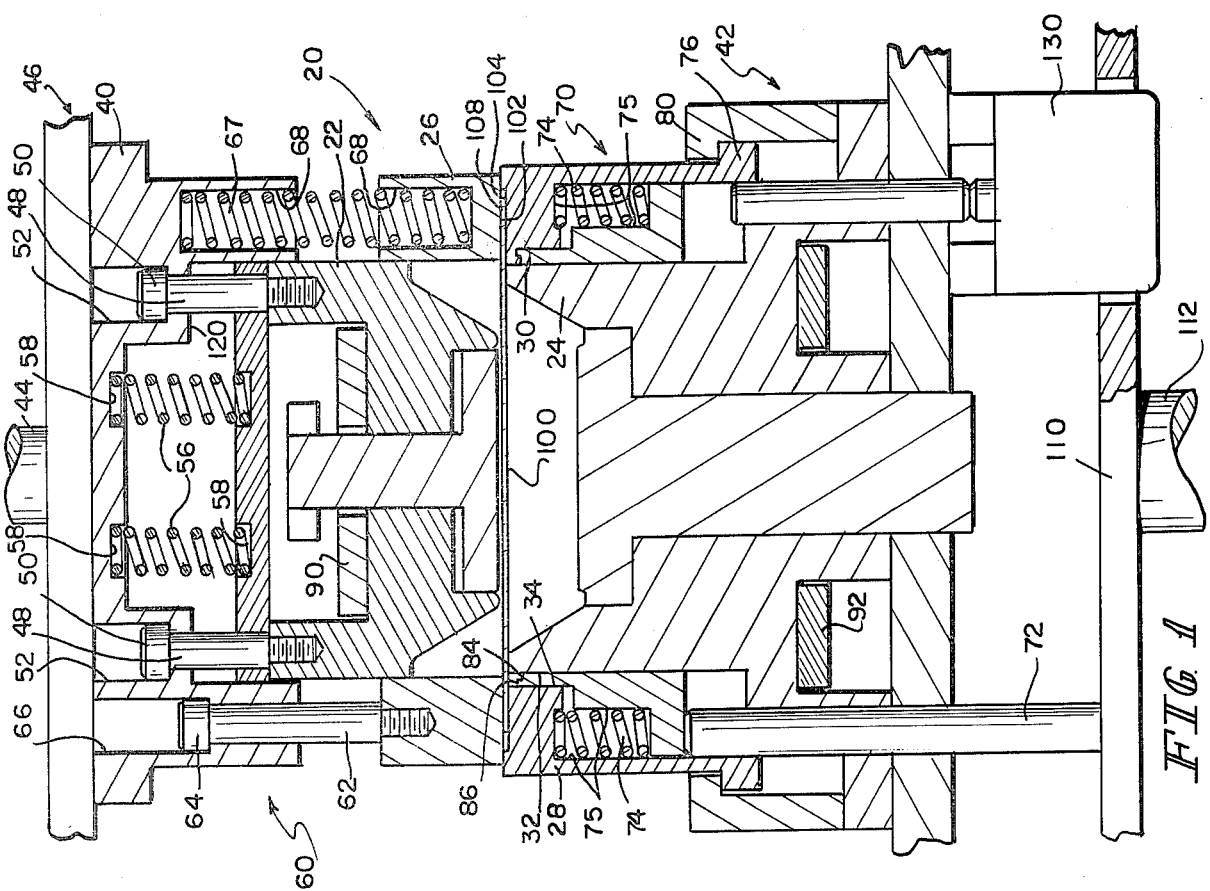
FIG. 1 is a vertically sectioned side elevational view of an apparatus for performing the method of the present invention at the beginning of a step of the method.

With the mechanism 20 in its position illustrated in FIG. 1, forming of the blank 100 is ready to begin.

The pins 72 are mounted from plate 110 which is driven from a low-pressure air cylinder or cushion through a piston rod 112. The force exerted by the cushion through rod 112 initially is greater than the force exerted by die springs 67. This holds draw pad 26 at the vertically upper extent of its travel relative to base 40, as illustrated in FIG. 2. Die springs 74, on the other hand, exert greater force than the cushion. This drives draw pad 28 toward the vertically upper extent of its travel relative to base 42. The excess of die spring 74 force over cushion force holds the ring 30 surface 86 somewhat below the top of its vertical travel relative to base 42. This is as illustrated in FIG. 2.

Draw pads 26, 28 and ring 30 remain relatively stationary throughout the forming step illustrated in FIG. 2. During this step, die springs 67 are compressed and punch 22 is lowered into forming engagement with horn 24 to form the central recess 114 of a container 116 from blank 100. Die springs 67 provide sufficient pressure to restrain the perimetral region 108 of blank 100 from wrinkling excessively during this initial forming step. The initial forming step is completed as the punch 22 and base 40 move downwardly until the base 40 contacts draw pad 26 and the recess 114 is contacted on one side by punch 22 and on the other by horn 24. At this point, much of the material of perimetral region 108 has been drawn from between the adjacent surfaces 102, 104 of draw pads 26, 28, respectively.

Referring now to FIGS. 2–3, punch 22 completes its downward motion relative to die base 40 and draw pad 26, and die springs 56 are compressed until punch 22 bottoms out against a shoulder 120 on die base 40. At this point, it may be desirable to apply heat through coils 90, 92 to "iron" and heat-set the material in the article 116. It will be appreciated that, through this step in the method, article 116 has been formed to provide a downwardly extending flange 122 surrounding the central region 114 and attached at its vertically upper extent to the region 114. The flange 122 provides a distal free edge 124 at its vertically lower extent (FIG. 3).

With particular reference to FIGS. 3–4, the bead-forming step is begun. Ring 30 begins its upward travel under the influence of pins 72 and the air cushion driving plate 110 through rod 112. The distal free edge 124 of article 116 is captured in groove 84 against radial deflection either outward or inward. As the vertically upward travel of ring 30 continues, the flange 122 is squashed, or crushed, into a double-thickness bead or rim 140.

Since the force from the air cushion coupled through piston rod 112 is not sufficient alone to drive the ring 30 upwardly against the compression of springs 74, a plurality of high-pressure, timed cylinders 130 are provided. Cylinders 130 are linked to ring 30 through the piston rods 132 associated with cylinders 130 and reciprocable pins 134 associated with each rod 132. It should be noted that under many circumstances, the force from the air cushion coupled through piston rod 112 alone will be sufficient to drive the ring 30 upwardly. Under such circumstances the timed cylinders 130 and piston rods 132 can be eliminated. The bead 140 is finished as illustrated in FIG. 5, and enlarged in FIG. 6.

As will be appreciated, the actual amount of crush or squash in the bead 140 is determined and controlled by the void 142 formed by the die mechanism 20 members 22, 24, 26, 28, 30. This permits a wide range of control both during the formation, and in the final configuration, of the multiple-thickness bead 140. In the alternative configurations illustrated in FIGS. 7–10, this can be appreciated. In those configurations, those elements numbered identically with the elements in FIGS. 1–6 perform the same or similar functions.

In FIG. 7, it will be appreciated that the void 142 is provided by the facing surfaces 102, 86 of draw pad 26 and ring 30, respectively, and by the surface 144 of draw pad 28.

In the embodiment illustrated in FIG. 8, the void 142 is formed by facing surfaces 102, 86 of draw pad 26 and ring 30, respectively, and by surface 144 of draw pad 128 and a wall 146 of a second, perimetrally extending groove formed in ring 30 between surfaces 86, 144.

In the embodiment of the invention illustrated in FIG. 9, the void 142 is provided by a wall 150 of a second groove formed in draw pad 26 adjacent ring 30, surface 104 of draw pad 28, and a wall 152 of die 22.

In the embodiment of the invention illustrated in FIG. 10, the void 142 is provided by a wall 160 of a second groove formed in draw pad 28 adjacent ring 30, and surface 102 of draw pad 26.

What is claimed is:

1. A method for forming a bead in an article formed from a blank of flexible material comprising holding a central region of the blank between two cooperating dies, while holding said central region, forming an axially extending flange in the region of the blank between said central region and the perimetral edge of the blank, capturing the perimetral edge against radial movement in a first groove provided in a ring movable with respect to said dies, moving the ring relative to the dies to form the region of the blank between the central region and the perimetral edge into a bead, and moving with respect to said dies and said ring cooperating draw pads provided adjacent said ring, the cooperating draw pads cooperating with the ring and dies to create a void into which the bead is formed, the configuration of the void controlling the formation of the bead.

2. The method of claim 1 in which the void is provided, in part, by a wall of a second groove formed in the ring adjacent the first groove.

3. The method of claim 1 in which the cooperating dies include a first, vertically upper die and a second, generally opposed, vertically lower die, and the draw pads include a first, vertically upper draw pad and a second, generally opposed, vertically lower draw pad.

4. The method of claim 3 in which the ring is disposed between, and is vertically reciprocable with respect to, adjacent surfaces of the first die and first draw pad.

5. The method of claim 3 in which the ring is disposed between, and is vertically reciprocable with respect to, adjacent surfaces of the second die and second draw pad.

6. The method of claim 1 in which the void is provided, in part, by a wall of a second groove formed in one of the draw pads adjacent the ring, a wall of the other draw pad, and a wall of the ring adjacent the first groove.

7. The method of claim 6 in which the void is further provided by a wall of one of the dies.

8. The method of claim 6 in which the second groove is provided in the draw pad opposite the ring.

9. The method of claim 6 in which the second groove is provided in the draw pad adjacent the ring.

10. Apparatus for forming a bead in a blank of flexible sheet material comprising opposed first and second cooperating dies for holding a central region of the blank, a ring and opposed first and second draw pads disposed about said cooperating dies and movable axially with respect to the first and second dies cooperatively to capture the perimetral region of the blank surrounding the central region to form the perimetral region into an axially extending flange having a proximal end attached to the central region and a distal end axially spaced from the proximal end, the ring including means defining a first groove for capturing the distal end against radial movement, means for moving the ring and first and second draw pads cooperatively with the distal end engaged in the first groove to form between the proximal and distal edges a bead, and cooperating surfaces of the ring and the first and second draw pads defining a void to control the shape of the bead.

11. The apparatus of claim 10 in which the cooperating surface of the first draw pad comprises a surface defining a second groove.

12. The apparatus of claim 10 in which the cooperating surface of the second draw pad comprises a surface defining a second groove.

13. The apparatus of claim 10 in which the cooperating surface of the ring comprises a surface defining a second groove adjacent the first groove.

14. The apparatus of claim 10 in which the void is further provided by a cooperating surface of one of the first and second dies.

15. The apparatus of claim 10 in which the first die is a vertically upper die, the second die is a generally opposed vertically lower die, the first draw pad is a vertically upper draw pad and the second draw pad is a generally opposed vertically lower draw pad.

16. The apparatus of claim 15 in which the ring is disposed between adjacent surfaces of the first draw pad and first die.

17. The apparatus of claim 15 in which the ring is disposed between adjacent surfaces of the second draw pad and second die.

18. An apparatus for forming a blank of sheet material into a plate, tray, dish or the like having a central region and an outer perimetral edge region, said apparatus comprising cooperating first and second dies for holding a central region of the blank, opposed first and second draw pads disposed respectively about said first and second dies for engaging the outer perimetral edge region of the blank, and means for forming a bead on the outer perimetral edge region of the blank, said forming means including a ring disposed about one of said dies between said one die and said draw pad disposed about said one die, said ring including means for engaging the outer perimetral edge of said blank, and means for reciprocating said ring relative to said dies and said draw pads.

19. The apparatus of claim 18 in which said first and second dies are a vertically upper die and a generally opposed vertically lower die, respectively, and the first and second draw pads are a vertically upper draw pad and a generally opposed vertically lower draw pad, respectively.

20. The apparatus of claim 19 in which the ring is disposed between adjacent surfaces of the first draw pad and first die.

21. The apparatus of claim 19 in which the ring is disposed between adjacent surfaces of the second draw pad and second die.

22. The apparatus of claim 18 in which said engaging means includes means defining on said ring a first groove, said means for reciprocating said ring relative to said dies causing said outer perimetral edge of said blank to be engaged by said first groove.

23. The apparatus of claim 22 in which said forming means further comprises a surface provided on the first draw pad defining a second groove cooperating with the ring.

24. The apparatus of claim 22 in which said forming means further comprises a surface provided on the second draw pad defining a second groove cooperating with the ring.

25. The apparatus of claim 22 in which said forming means further comprises a surface provided on the ring defining a second groove adjacent the first groove.

26. The apparatus of claim 22 in which said forming means further comprises a surface provided on one of the first and second dies cooperating with the ring to define a second groove.

* * * * *